United States Patent
Mukherjee et al.

(10) Patent No.: US 9,645,928 B2
(45) Date of Patent: May 9, 2017

(54) DISTRIBUTED DIRECTORY SERVICE FOR IN-MEMORY COMPRESSION UNIT HOME LOCATION

(71) Applicant: Oracle International Corporation, Redwood Shores, CA (US)

(72) Inventors: Niloy Mukherjee, Belmont, CA (US); Amit Ganesh, San Jose, CA (US); Vineet Marwah, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 64 days.

(21) Appl. No.: 14/820,672

(22) Filed: Aug. 7, 2015

(65) Prior Publication Data
US 2017/0039137 A1 Feb. 9, 2017

(51) Int. Cl.
*G06F 12/08* (2016.01)
*G06F 12/0817* (2016.01)
*G06F 3/06* (2006.01)
*G06F 12/1009* (2016.01)
*G06F 12/0868* (2016.01)

(52) U.S. Cl.
CPC .......... *G06F 12/0824* (2013.01); *G06F 3/064* (2013.01); *G06F 3/067* (2013.01); *G06F 3/0673* (2013.01); *G06F 12/0868* (2013.01); *G06F 12/1009* (2013.01); *G06F 2212/314* (2013.01); *G06F 2212/465* (2013.01); *G06F 2212/621* (2013.01); *G06F 2212/656* (2013.01)

(58) Field of Classification Search
None
See application file for complete search history.

(56) References Cited

U.S. PATENT DOCUMENTS

2016/0026660 A1    1/2016 Mukherjee et al.

*Primary Examiner* — Kevin Verbrugge
(74) *Attorney, Agent, or Firm* — Hickman Palermo Becker Bingham LLP

(57) ABSTRACT

Techniques are described herein for maintaining a directory map that contains a data chunk-to-server mapping. Directory maps, maintained within the volatile memory of each server node in the set of multiple server nodes, include a node hierarchy represented as a tree structure in which each node represents a range of an on-disk address range. Each child node, within the node hierarchy, represents a sub-range of the on-disk address range represented by the parent node of the child node. Once a data chunk is loaded into volatile memory of a particular server, mapping information relating the particular on-disk starting address of the data chunk loaded into volatile memory and the pointer address to the location in volatile memory is loaded into one or more node in the directory map. Loading mapping information into the directory map includes first, locating a target child node, in the node hierarchy that has a range into which the particular on-disk starting address falls, where the target node is the Nth child node of a particular parent node. Then inserting a mapping entry into the target child node. Then determining a set of parent nodes, other than the particular parent node of the target child node, that has ranges that overlap with the particular on-disk address range. Then inserting into each Nth child node of each parent node in the set of parents nodes, an entry corresponding to mapping information that includes an indication of the on-disk starting address and the particular in-memory address.

20 Claims, 11 Drawing Sheets

CHUNK-TO-NODE MAPPING

| CHUNK | START ADDR | END ADDR | HOST NODE |
|---|---|---|---|
| CHUNK 302 | 330 | 336 | NODE 102 |
| CHUNK 304 | 336 | 342 | NODE 112 |
| CHUNK 306 | 342 | 350 | NODE 122 |

FIG. 3B

DISTRIBUTED DIRECTORY SERVICE FOR IN-MEMORY COMPRESSION UNIT HOME LOCATION

CROSS-REFERENCE TO RELATED APPLICATIONS; BENEFIT CLAIM

This application is related to U.S. Provisional Application No. 62/027,535 entitled "Distribution Of An Object In Volatile Memory Across A Multi-Node Database", filed Jul. 22, 2014, the contents of which are incorporated by reference for all purposes as if fully set forth herein.

FIELD OF THE INVENTION

The present invention relates to data storage and retrieval techniques in a database cluster, and more specifically to storage and retrieval of metadata related to mapping on-disk page ranges to volatile memory addresses.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be loaded into volatile memory. Various approaches for loading entire database objects, or selected portions thereof, into volatile memory to speed up query processing are described in U.S. patent application Ser. No. 14/377,179, entitled "Mirroring, In Memory, Data From Disk To Improve Query Performance", filed Jul. 21, 2014, the contents of which are incorporated herein in its entirety (hereinafter, the "Mirroring application").

According to the approaches described in the Mirroring application, data objects, or portions thereof, are stored in volatile memory in a different format than the format that those same objects have on disk. For example, the in-memory version of the objects may be in a column-major format, while the on-disk version stored data in a row-major format. The in-memory version of the object (or selected portions thereof), is referred to as an In-Memory Compression Unit (IMCU) because the data contained therein is often compressed.

In a clustered database system, multiple "server nodes" have access to the same on-disk copy of a database. Typically, each server node is a computing device with its own local volatile memory and processors. Each server node typically runs its own distinct instance, or set of instances, of the database server. Queries that target the shared database may be sent to any database server instance on any of the server nodes.

The speed at which a given database server instance is able to answer a query is based, at least in part, on whether the server node on which the database server instance is running has, within its local volatile memory, an IMCU that contains the data targeted by the query. For example, a query "select c1 from emp where c2>10" may be executed much faster on a server node that hosts an IMCU with values from c1 and c2 of the emp table, than on a server node that has no IMCU containing data targeted by the query.

Thus, in order to determine whether a particular database server instance would be best at processing a query, it is necessary to quickly determine whether data targeted by the query is in any IMCU within the local volatile memory of that particular database server instance. According to one embodiment, a database server instance that receives a query searches a metadata directory map to determine whether or not the data targeted by a query is in a local IMCU. In one embodiment, the database server instance provides an on-disk address for the data targeted by the query (the "target data"). The on-disk address of the target data shall be referred to hereafter as the "target on-disk address".

A metadata directory map is a lookup directory that, for any given target data, maps the on-disk address of target data to an in-memory address of the IMCU that contains the target data. In order for a server node to quickly determine the location of IMCUs, the metadata directory map is stored within the local volatile memory of the server node. When the database server receives a query that requires accessing particular target data stored at a target on-disk address, the database server uses the metadata directory map to lookup the memory location of the IMCU that contains the particular target data. The memory location provided by the metadata directory map indicates the physical address, within local volatile memory, of the IMCU that contains the target data.

For example, assume that a database server instance receives a query that targets columns c1 and c2 of table emp. Assume further that table emp is located on disk at address X. Thus, X is the target on-disk address. Under these circumstances, the database server instance would use address X as the key for looking up the in-memory address of the IMCU that contains columns c1 and c2 of table emp. For the purpose of discussion, assume that the IMCU that contains columns c1 and c2 of table emp is located at address Y within the volatile memory of the database server on which the database server instance is executing. Consequently, the metadata directory map would return "address Y" based on the address X.

A variety of different data structures may be used to implement the metadata directory map. For example, the metadata directory map may be implemented as a tree structure. An approach to implementing a metadata directory map using a tree structure is to have each node within the tree structure represent a particular range of on-disk data. For example, the root node may be defined as the on-disk address range for all data represented by the tree structure. Thus, if the tree structure is being used to represent a particular tablespace within a database, the root node of the tree structure would represent the entire on-disk address range of that tablespace.

Each of the child nodes of any given parent node represent a distinct sub-range of the range represented by the parent node. For instance, if the root node corresponds to a tablespace that has the size of 128 terabytes (TB), then the root node would represent the on-disk range from 0-128 TB. If the root node had a total of 128 child nodes, then each child node would represent a distinct sub-range, each of which would have the size of 1 TB. Subsequent child nodes at each level would then represent smaller sub-ranges of their respective parent node. A leaf node at the end of any given branch represents the smallest sub-range of all nodes that belong to that branch.

Various approaches have been used to populate metadata directory maps that have been implemented as tree structures, as described above. One such approach to populating the metadata directory map is to store, within the leaf nodes that implement the metadata directory, the in-memory address for a given IMCU that is loaded into local volatile memory of a server node. The server node first determines the on-disk address range of the loaded IMCU. Then the server node finds all leaf nodes, within the metadata directory map, that fall within the on-disk address range of the loaded IMCU. The server node then populates each leaf node that falls within the on-disk address range of the loaded IMCU with the in-memory address corresponding to the starting location of the loaded IMCU in local volatile memory.

For example, assume the server node loaded an IMCU containing target columns c1 and c2 from table emp. To keep the directory map up-to-date, the directory map would have to be updated to reflect that the on-disk addresses for columns c1 and c2 of table emp are mapped to the in-memory address of the newly-loaded IMCU.

For the purpose of explanation, it shall be assumed that table emp starts at on-disk address 32 KB. However, it is insufficient to merely map the starting address of table emp to the in-memory address of the IMCU, because all on-disk addresses covered by table emp need to be mapped to the newly-loaded IMCU.

Consequently, the server node would first determine the entire on-disk address range of the IMCU. For the purpose of explanation, it shall be assumed that on-disk address range of the IMCU covers the range of 32 KB-2048 KB. Then, the server node would locate all leaf nodes, within the directory map, that fall within the on-disk address range of 32 KB-2048 KB. Assume that each leaf node in the directory map represents a range of 32 KB. The server node would then find a set of leaf nodes that cover the range of 32 KB-2048 KB. Then, the server node would populate each leaf node, in the set of leaf nodes that cover the range of 32 KB-2048 KB, with the in-memory starting address of the loaded IMCU.

The drawback to this approach is that redundant mapping information corresponding to the in-memory starting address of the loaded IMCU is populated into every single leaf node that represents an on-disk address range that falls within the on-disk address range of the loaded IMCU. If the IMCU covers a particularly large on-disk address range, then the set of leaf nodes that contain the same mapping information becomes very large as well. Since the metadata directory map is stored within local volatile memory of the server node, this results in the server node having less local volatile memory space to store other things, such as additional IMCUs.

Another approach to populating the metadata directory map is to only populate leaf nodes that correspond to the on-disk starting address and the on-disk ending address of the loaded IMCU. In this approach, the server node, for a loaded IMCU, determines the on-disk starting address and on-disk ending address for the loaded IMCU. Then, the server node finds leaf nodes that correspond to the on-disk starting address and the on-disk ending address. The server node then populates only these two leaf nodes with (a) the in-memory address of the loaded IMCU, and (b) the on-disk address range of the IMCU. By also populating the on-disk address range of the IMCU, when searching for target data the server node can use the target on-disk address and the on-disk address range of the IMCU to determine whether target data is loaded into the particular IMCU. To determine whether target data is loaded into a particular IMCU, the server node first finds the leaf node that corresponds to the target on-disk address. If the leaf node does not contain any mapping information, then the server node scans preceding leaf nodes until it finds mapping information to an IMCU. Once the server node finds mapping information for an IMCU in a leaf node, the server node determines whether this IMCU covers a range that includes the target on-disk address.

For example, assume the server node loaded an IMCU covering a range of 32 KB-2048 KB and that each leaf node in the directory map represents a range of 32 KB. The server node would first determine that the on-disk starting address for the loaded IMCU is 32 KB and the on-disk ending address is 2048 KB. The server node would then find the leaf node that represents a range covering the on-disk starting address (32 KB) and the leaf node that represents a range covering the on-disk ending address (2048 KB). Then the server node would populate these two leaf nodes with the in-memory starting address of the loaded IMCU and the on-disk address range of the loaded IMCU (32 KB-2048 KB).

Based upon the current example, if the server node received a request for target data corresponding to a target on-disk address of 102,400 KB (100 MB), the server node would find the leaf node corresponding to a range covering 102,400 KB. Since the leaf node corresponding to 102,400 KB does not contain any mapping information, the server node would then begin scanning preceding leaf nodes. For example, the server node would first scan the leaf node corresponding to 102,368 KB (immediately preceding leaf node) for mapping information. The server node would continue to scan each preceding leaf node until it reaches a leaf node with mapping information (the leaf node corresponding to 2048 KB). Since the 2048 KB leaf node contains mapping information, the server node would determine based upon the on-disk address range of the loaded IMCU (32 KB-2048 KB) whether or not the loaded IMCU contains the target on-disk address. Here, the server node would conclude that the target information does not reside in any local IMCU, and would go to disk for the target information. The drawback to this approach is that the server node scans an indefinite number (which could be very high) of preceding leaf nodes to determine whether or not the target data is contained within a loaded IMCU. By having to scan an indeterminate number of leaf nodes, the time efficiency saved by loading target data into an IMCU is compromised by the time it takes to determine whether target data is loaded into an existing IMCU in local volatile memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3B is a block diagram illustrating a chunk to instance mapping;

DETAILED DESCRIPTION

Figure 1:
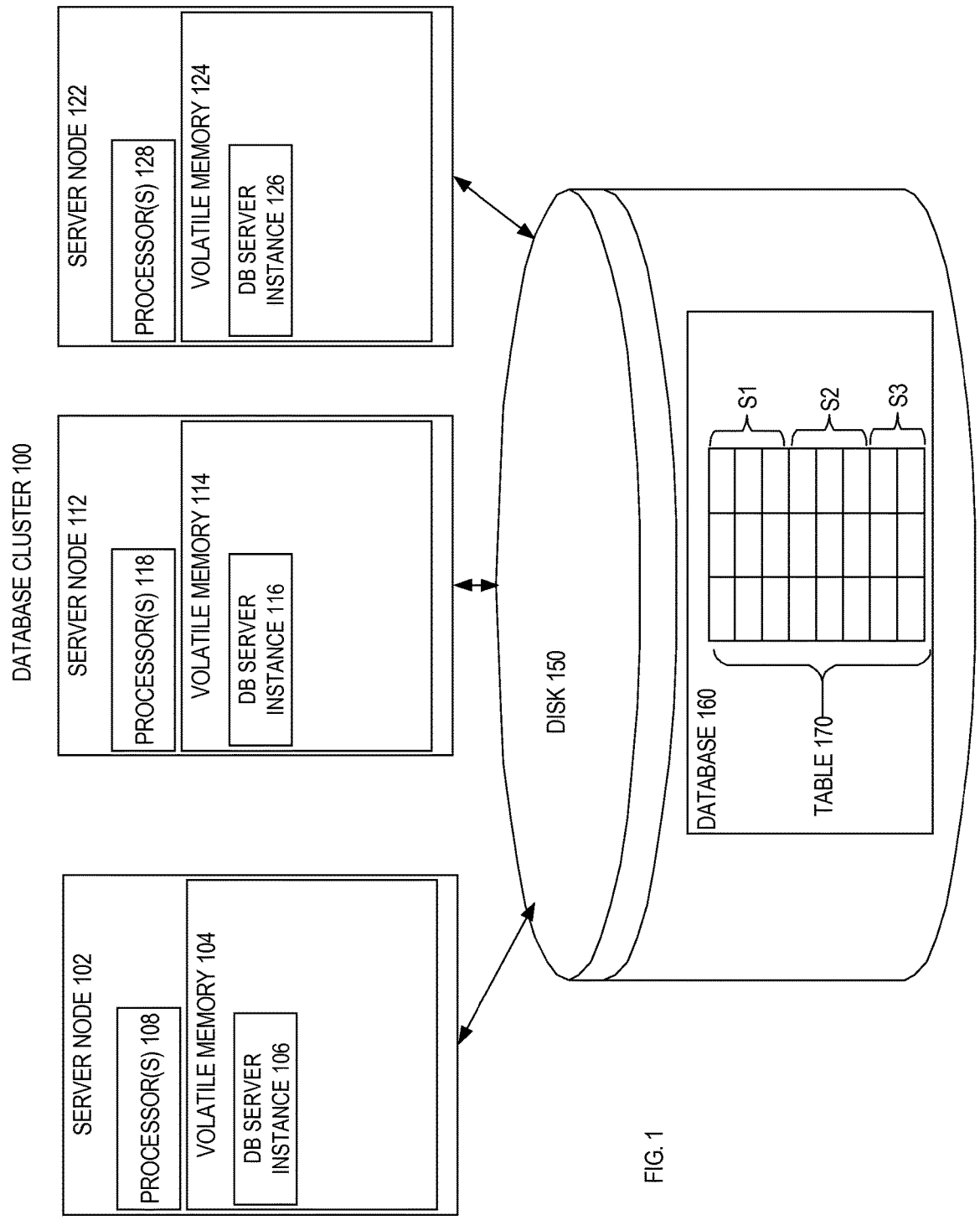
FIG. 1 is a block diagram illustrating system architecture of a database server.
Figure 2:
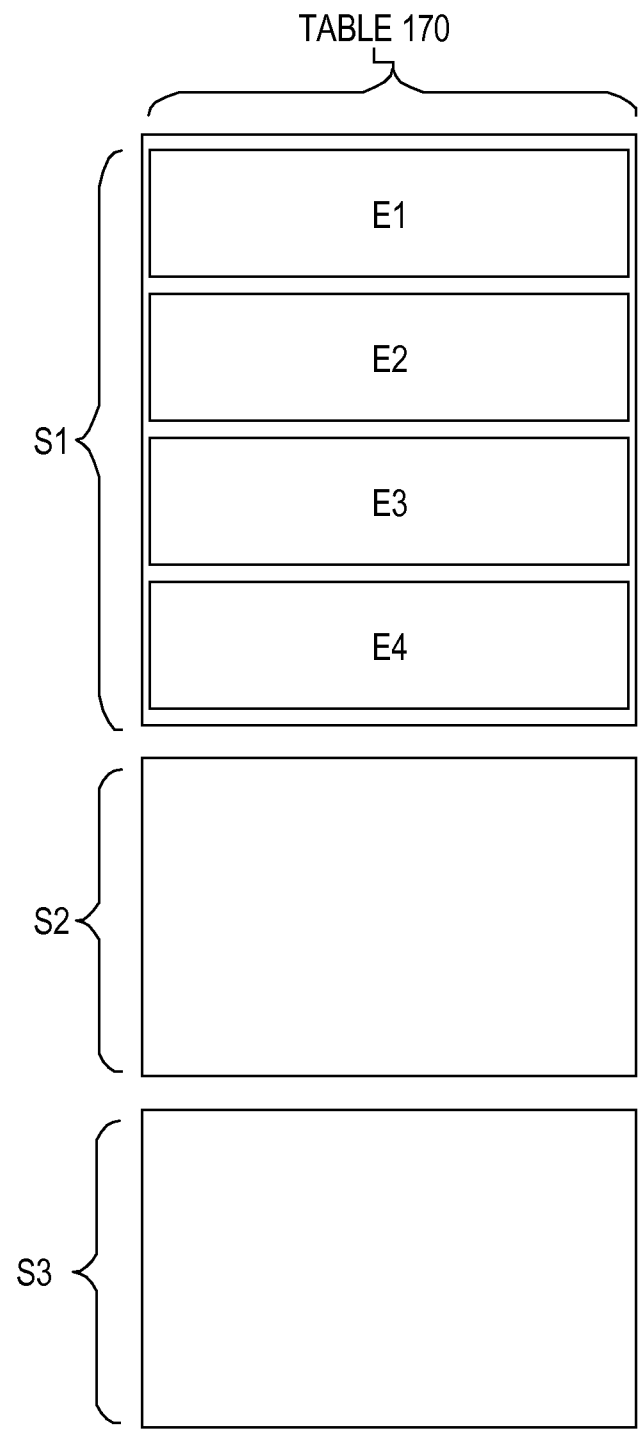
FIG. 2 is a block diagram illustrating a database object composed of segments and segments composed of extents.
Figure 3A:
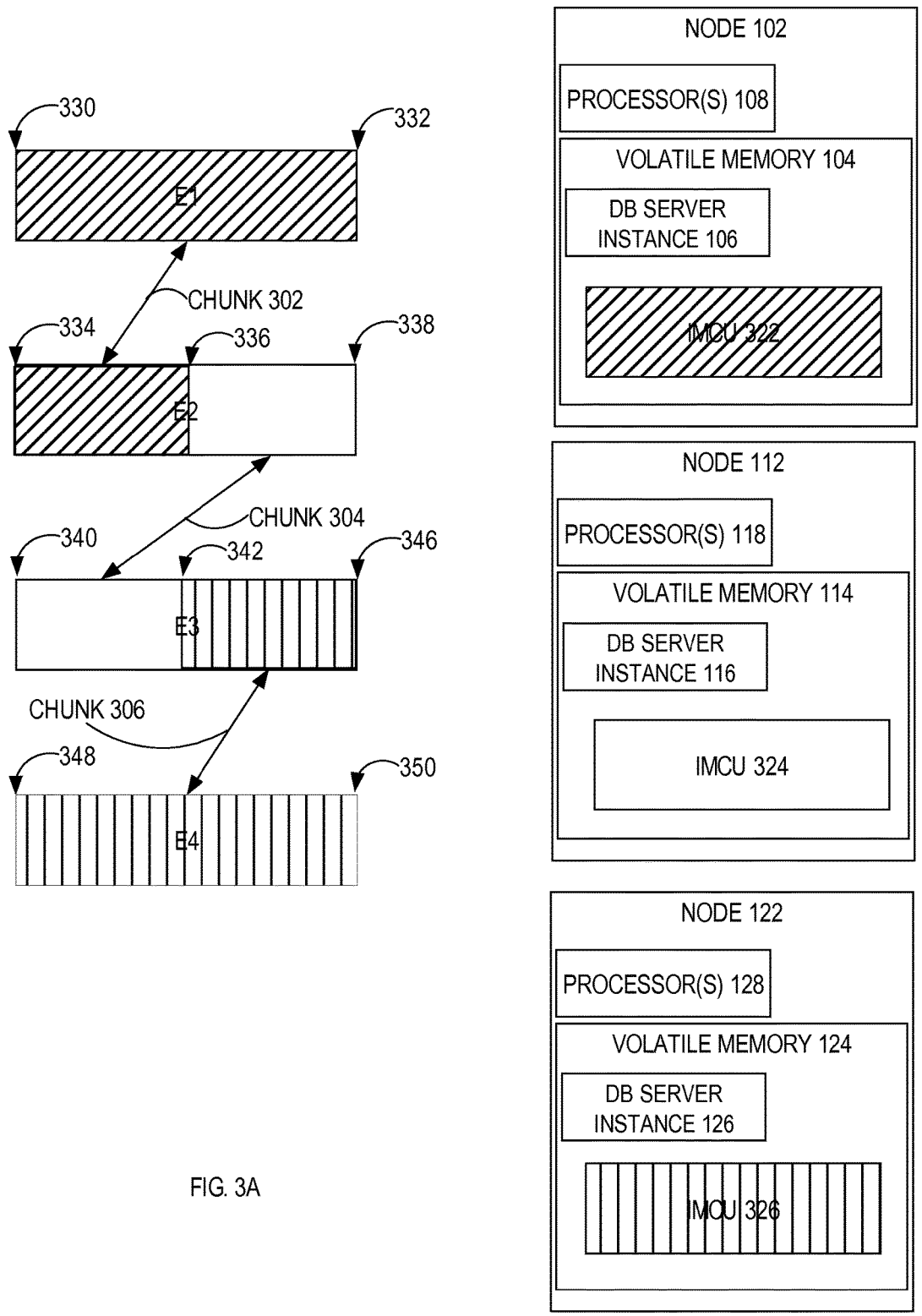
FIG. 3A is a block diagram illustrating a database object divided into chunks and distributed across volatile memory.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for distributing distinct portions of database objects across the volatile memories of a plurality of server nodes in a clustered database system. The portion of a database object that is assigned to any given server node is referred to herein as a "data chunk". In some embodiments, within the volatile memory of a server node, each such data chunk is encapsulated in a distinct IMCU. In alternative embodiments, the in-memory representation of a data chunk may have other formats, including the same format in which the data for the chunk is represented on disk.

Each of the multiple server nodes maintains a directory map that indicates a correlation between data located at an on-disk address and the same data that has been loaded into volatile memory of a particular server node. In order to balance limitations between searching efficiency and the volatile memory space limitations of the directory map, a specific data structure is used, where mapping information is inserted into selective nodes of a tree structure within a directory map.

Techniques are described herein for maintaining a directory map that contains an on-disk-address-to-in-memory-address mapping. Directory maps, maintained within the volatile memory of each server node, include a node hierarchy represented as a tree structure in which each node represents an on-disk address range. An on-disk address range is a range of data blocks identified by their on-disk addresses and shall be referred to hereafter as the "on-disk page range". Each child node, within the node hierarchy, represents a distinct sub-range of the on-disk page range represented by the parent node of the child node.

Once a data chunk is loaded into volatile memory of a particular server, the following information is loaded into one or more nodes of the directory map maintained by that particular server: (a) mapping information relating the particular on-disk starting address of the data chunk to the volatile memory address for the loaded data chunk, and (b) a pointer to the location in volatile memory where the data chunk was loaded. According to one embodiment, loading mapping information into the directory map includes:

locating a target leaf node, in the node hierarchy, that has a range into which the particular on-disk starting address falls, determining that the target leaf node is the Nth child node of a particular parent node, inserting a mapping entry into the target leaf node, determining a set of parent nodes, other than the particular parent node of the target leaf node, that have ranges that overlap with the particular on-disk page range of the particular data chunk, and inserting into each Nth leaf node of each parent node in the set of parents nodes, an entry that includes (a) an indication of the on-disk starting address of the chunk stored in the IMCU and (b) the particular in-memory address of the IMCU.

Additional techniques are described herein for determining whether target data is in a local IMCU by searching the directory map based upon the target data's target on-disk address. Specifically, the server node traverses the node hierarchy of the directory map to a leaf node that represents the target on-disk address. If the leaf node does not contain mapping information, then the server node scans preceding leaf nodes until a termination condition is satisfied. In one embodiment, the termination conditions include (a) finding an entry in a scanned leaf node, and (b) having scanned a threshold number of nodes without finding an entry. When scanning leaf nodes, the scanned leaf nodes may also include leaf nodes that are children of one or more preceding parent nodes.

If the server node finds an entry in a preceding node, thereby triggering the termination condition, then the server node determines whether the entry corresponds to the target data. The server node first determines whether the entry contains mapping pointing to a location in volatile memory by checking to see of the entry identifies a local volatile memory address. Then the server node determines whether the range of on-disk addresses covered by the entry includes the target data.

Other outcomes of triggering a termination conditions include, but are not limited to: scanning a certain number of preceding leaf nodes, based upon a threshold, without finding an entry; finding an entry in a particular leaf node that does not cover a range of on-disk addresses that includes the target on-disk starting address; and finding an entry that covers a range that includes the on-disk starting address but, identifies another server node as the IMCU location.

System Overview

Referring to FIG. 1, it is a block diagram that depicts a database cluster 100 according to one embodiment. In the embodiment illustrated in FIG. 1, three server nodes 102, 112 and 122 have access to the same database 160. For the purpose of illustration, database 160 is shown as stored on a single shared disk 150, but in alternative embodiments may be spread across multiple disks to which each of the server nodes 102, 112 and 122 have access.

Server nodes 102, 112 and 122 respectively have one or more processors 108, 118 and 128, and local volatile memory 104, 114 and 124. In addition, server nodes 102, 112 and 122 are respectively executing database server instances 106, 116 and 126. While in the illustrated embodiment each server node is executing a single database server instance, in alternative embodiments a single server node may execute more than one database server instance.

Database 160 includes a table 170. Each of the server nodes 102, 112 and 122 is able to access data items from table 170 from the copy of table 170 that resides on disk 150. However, it is much faster for any given database server instance to access data items of table 170 that are loaded into the volatile memory that resides on the server node in which the database server instance is executing.

Table 170 is composed of three segments (S1, S2 and S3), where a "segment" is one or more extents, and where an "extent" is a contiguous series of on-disk data blocks. According to one embodiment, if segment S1 of table 170 has been designated as "in-memory enabled", distinct chunks of segment S1 are loaded into each of volatile memories 104, 114 and 124. The loading of the chunks of segment S1 into volatile memories 104, 114 and 124 may be performed pro-actively, or on an as-needed basis.

For the purpose of illustration, individual segments of a table are divided into data chunks that are distributed among the various server nodes of a multi-node system. However, entire table partitions, or entire tables, may be memory-enabled and divided into data chunks that are distributed among the various server nodes of a multi-server node system. The granularity at which the chunks are determined may vary from implementation to implementation, and the techniques described herein are not limited to any particular level of granularity.

Load-Segment Events

A load-segment event is an event that triggers the loading, into volatile memory, of a segment. Various events may trigger the loading of a segment of a memory-enabled object into volatile memory. For example, in some cases, a segment of a memory-enabled object may be loaded into volatile memory upon system start up. In other cases, receiving a query that targets data items from the segment of the memory-enabled object may trigger loading a segment of a memory-enabled object into volatile memory. In yet other cases, a database application may submit an explicit request for a particular segment of a memory-enabled object to be loaded into volatile memory. The techniques described herein are not limited to any particular load-segment event.

According to an embodiment, a load-segment event includes a server node determining that the segment has not already been loaded into the volatile memory of any server node. Such a check may involve inspecting a metadata directory map for metadata, within the volatile memory of the server node, and determining whether data chunks of the segment have been loaded into any server node.

In order to determine which data chunks of the segment need to be loaded, for each segment, a server node is designated as the load operation master. The load operation master is the server node that coordinates the load-segment operation. The load operation master is responsible for coordinating the loading of data chunks of a particular segment into volatile memory. The load operation master divides, assigns, and communicates data chunk assignments to other server nodes within the multi-node database cluster.

Upon occurrence of a load-segment event for a particular segment, the server node designated as load operation master queries its directory map to determine what data chunks within the segment need to be loaded into volatile memory. In one embodiment, if a particular data chunk has already been loaded into the volatile memory of a server node, then the particular data chunk will not be reloaded into another server node. However, in alternative embodiments, the same data chunk can be loaded into IMCUs of multiple nodes within the cluster, thereby providing redundancy at the expense of memory consumption.

Once the load operation master has determined which data chunks need to be loaded into volatile memory, the load operation master divides the data chunks and allocates data chunks to a set of server nodes within the multi-node database cluster. Each designated server node then receives a data chunk allocation request from the load operation master. Upon receiving the data chunk allocation request, each server node within the set of server nodes loads their assigned data chunks into volatile memory.

Once the data chunks have been loaded into volatile memory, each server node that loaded a chunk updates its local directory map. The entries for a locally-loaded chunk include a pointer to that data chunk's location in volatile memory. In addition to updating its own directory map, each server node that loaded a chunk broadcasts a message to the other server nodes. The message contains a list of data chunks that have been loaded into the server node, where each data chunk is identified by its corresponding on-disk starting address and on-disk range. Upon receiving the broadcasted message, the other server nodes populate their directory map to include mapping for the list of data chunks, where mapping for the list of data chunks maps the on-disk address to a foreign server node identifier. Details on the population of the directory map are discussed in detail in the DIRECTORY MAP section herein.

Sub-Chunk-to-Node Mappings

Figure 4:
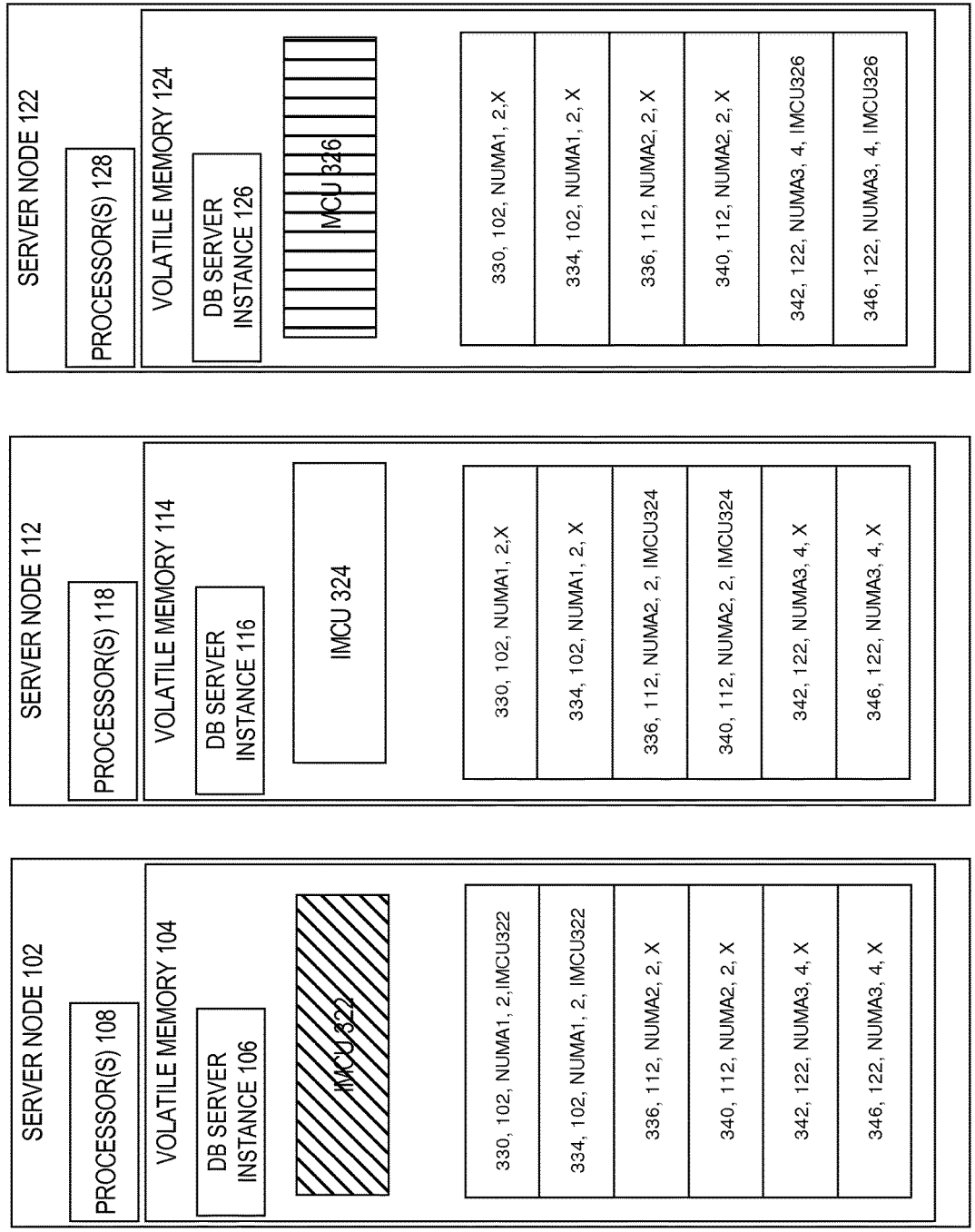
FIG. 4 is a block diagram of a distributed database object in volatile memory of three nodes with an associated chunk-to-node mapping.

A "sub-chunk" refers to a contiguous set of disk blocks with endpoints that align with endpoints from either an on-disk extent or the data chunk to which the sub-chunk belongs. Typically, a data chunk will have at least as many sub-chunks as the number of extents that are spanned by the data chunk. For example, each of data chunks 302, 304 and 306 span two extents, so each of data chunks 302, 304 and 306 have two sub-chunks. FIG. 4 depicts an embodiment of a block diagram that illustrates the sub-chunk-to-node mapping information maintained by server nodes 102, 112 and 122. In the embodiment illustrated by FIG. 4, each entry in the sub-chunk-to-node mapping, and has the form (start address, host node, host socket, end address, IMCU pointer), where:
- "start address" is the starting disk address of the corresponding sub-chunk
- "host node" is the node that is assigned to host the chunk that contains the corresponding sub-chunk
- "host socket" is the non-uniform memory access (NUMA) socket, within the host node, that has most efficient access to the portion of volatile memory containing the IMCU that contains the corresponding sub-chunk (NUMA-based embodiments shall be described in greater detail hereafter).
- "contiguous length" is the length of the corresponding sub-chunk
- "IMCU pointer" is a pointer to the location, within local volatile memory, of the IMCU that contains the data of the corresponding sub-chunk Thus, the first entry in the sub-chunk-to-node mappings within server node 102 indicates:
- "start address"=address 330 (the start of extent E1)
- "host node"=server node 102
- "host socket"=socket 1 within server node 102.
- "contiguous length"=2 (the end of extent E1 is 332)

"IMCU pointer"=IMCU322 (which represents the starting address, within volatile memory 104, of IMCU 322).

In an embodiment, entries maintained by one server node for sub-chunks that are assigned to another server node do not have all pieces of information. For example, the third entry in the sub-chunk-to-node mappings of server node 102 indicates:

"start address"=address 336 (the start of chunk 304)
"host node"=node 112
"host socket"=socket 2 within node 112.
"contiguous length"=2 (the end of extent E2 is 338)
"IMCU pointer"=X (which indicates that no value is provided).

No IMCU pointer value is provided for sub-chunks that are stored in the volatile memory of other server nodes because such information is not meaningful to a server node that cannot directly access that volatile memory.

Directory Map

In an embodiment, metadata related to segments loaded into volatile memory are stored in a directory map. A directory map is an auxiliary memory map located in the volatile memory of each server node. The directory map stores information related to on-disk page ranges for segments loaded into volatile memory, where the stored information is a pointer to the corresponding volatile memory address for an IMCU loaded into volatile memory of the current server node. In an embodiment, the sub-chunk-to-node mapping is stored in a directory map within the volatile memory of the server node. If data chunks of a segment are currently loaded into volatile memory of a server node other than the current server node then the directory map will store information that corresponds to the loaded data chunks of the segment and the specific server node where the data chunks have been loaded into the corresponding volatile memory.

Figure 5A:
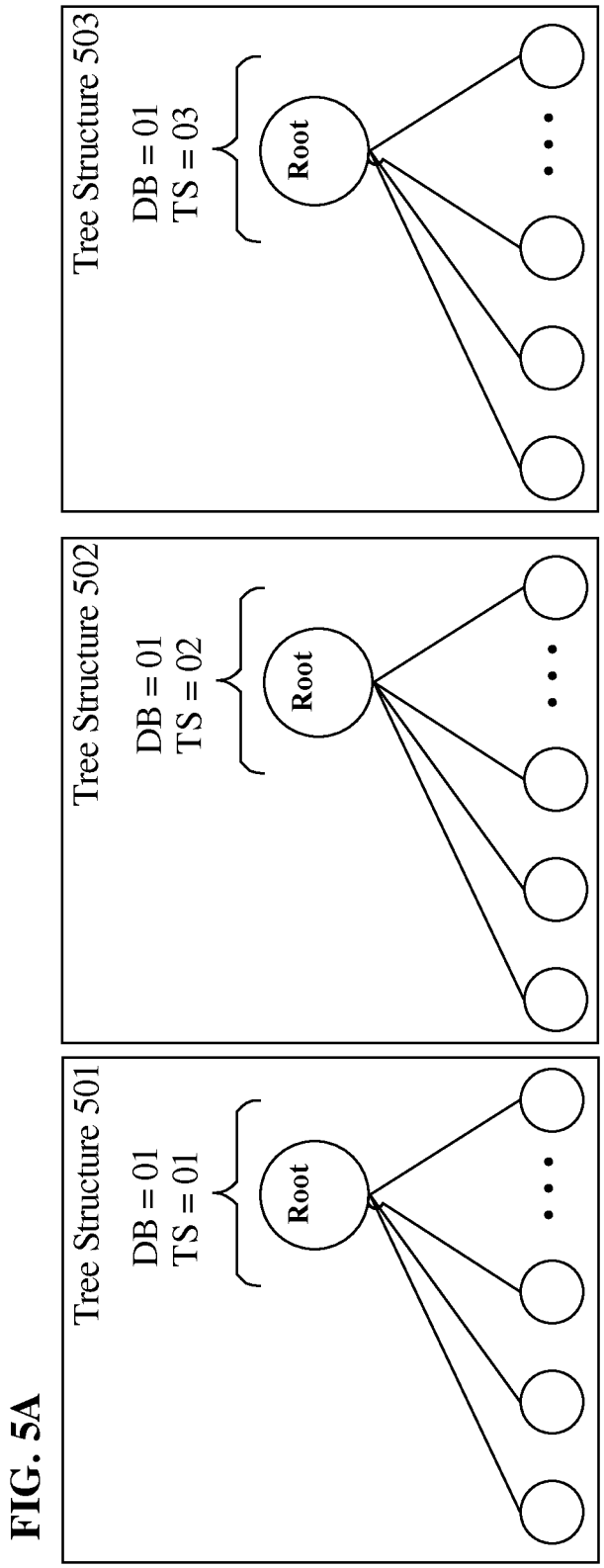
FIG. 5A depicts a directory map containing multiple node hierarchies.

The directory map implements a node hierarchy in the form of a tree structure of nodes that represents an on-disk page range for an entire table space within a database. The directory map may contain one or more tree structures each representing a different tablespace within the database. In an embodiment, the directory map may identify different tablespaces, each represented by tree structures, using the database identifier and tablespace identifier. For example, FIG. 5A depicts a directory map with multiple tree structures, where each tree structure is identified by the corresponding database ID and tablespace ID. The directory map in FIG. 5A includes three node hierarchies for three different tablespaces: tree structure 501 represents a node hierarchy for tablespace "01" in database "01", tree structure 502 represents a node hierarchy for tablespace "02" in database "01", and tree structure 503 represents a node hierarchy for tablespace "03" in database "01".

A tree structure is a collection of nodes containing a root node and potentially many levels of additional nodes that form a hierarchy. The root node represents the entire on-disk page range for the associated table space. Child nodes that descend directly from the root node each represent a distinct subset of the on-disk page range of the associated table space. Subsequent child nodes each represent a distinct subset of the range represented by each parent node. Leaf nodes are nodes at the deepest level of the tree structure that do not have any child nodes associated with them. In an embodiment, each leaf nodes represent a single data block.

The size of a data block, within a tablespace, is configurable. For example, in some database systems, tablespaces allow data blocks to be configured as small as 2 KB and as large as 32 KB. Configuring the size of data blocks is also restricted by the overall size of the tablespace because the maximum number of data blocks allowed within a tablespace is $2^{32}$ (4,294,967,296) data blocks. Other embodiments may enforce different constraints of data block sizes with a particular tablespace.

For the purposes of explanation, it shall be assumed that a tablespace is restricted to having a maximum of $2^{32}$ data blocks. Tablespaces with a size of 128 TB are therefore restricted to having data blocks sized at 32 KB each. Leaves in a directory map for a 128 TB tablespace would represent an on-disk page range of 32 KB each (one data block). Similarly, leaves in a directory map for a smaller tablespaces, such as a 32 TB tablespace, would represent an on-disk page range as small as 2 KB, based upon the maximum data block constraint.

The number of levels in a directory map under the root node is configurable. For example, a tree structure may comprise only one level of child nodes from the root node. In the case of a 128 TB tablespace, each child node would be a leaf node representing a 32 KB range. This configuration however would result in very inefficient searching because the root node (128 TB) would have a maximum of 4 billion child nodes (32 KB each). Other embodiments may implement multiple levels of parents and children in order create an efficient tree structure for search purposes.

Figure 5B:
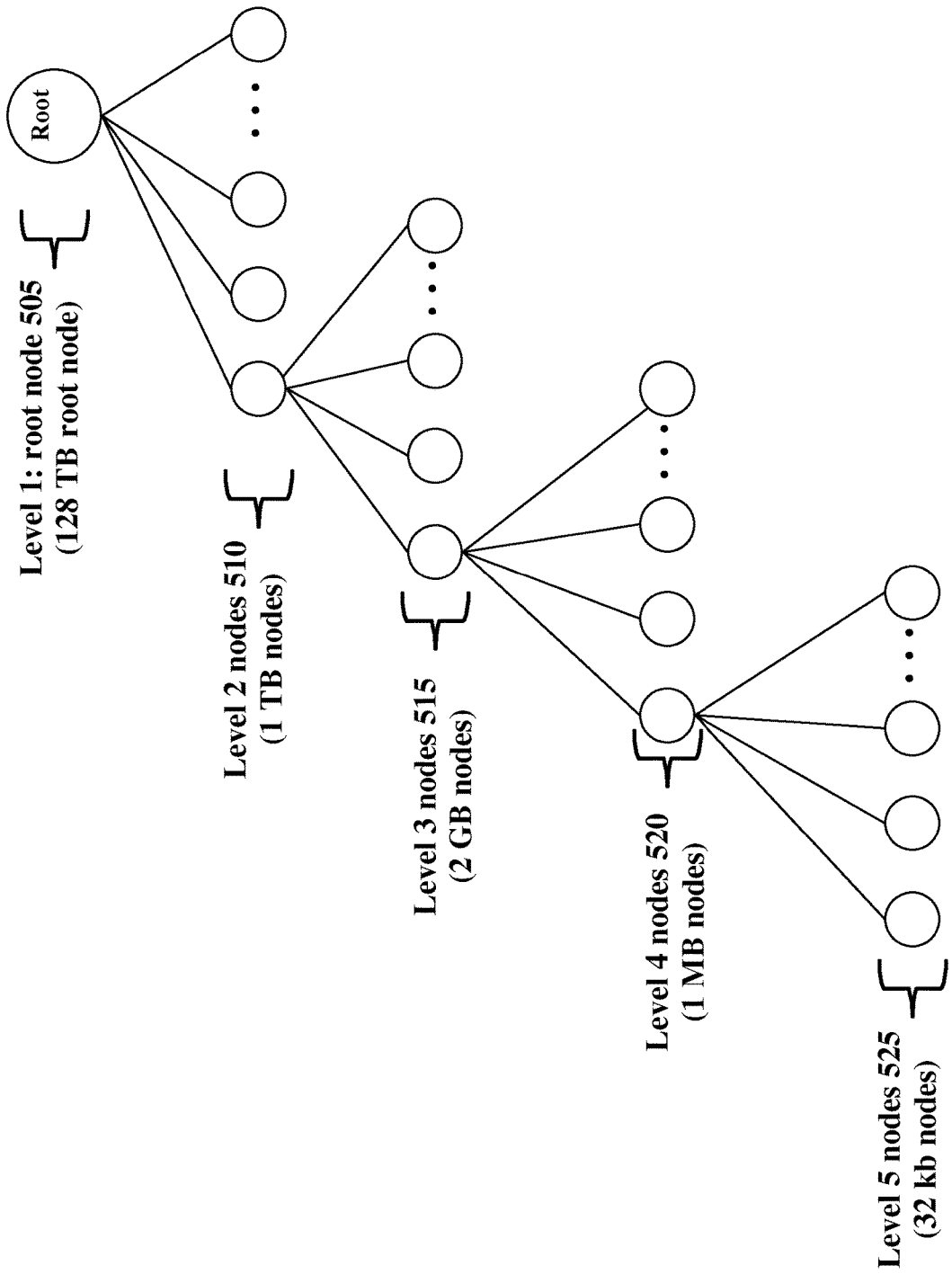
FIG. 5B is a node hierarchy for a particular tablespace depicted as a tree structure with multiple levels.

FIG. 5B depicts an embodiment of a tree structure with multiple levels. The root node 505 represents a table space within a database with a size of 128 TB. The tree structure in FIG. 5B is configured to have a total of five levels, with the root node 505 at level 1 and the "leaf nodes" which are the level 5 nodes 525. The level 2 nodes 510 are direct descendants of the root node 505 and represent an on-disk range of 1 TB each. The maximum number of level 2 nodes is 128, each representing 1 TB of the total 128 TB represented by the parent node, the root node 505.

The level 3 nodes 515 are direct descendants of corresponding level 2 nodes 510. The level 3 nodes 515 each represent an on-disk range of 2 Gigabytes (GB). The maximum number of level 3 nodes 515 that can be a child of a single level 2 node 510 is 512.

The level 4 nodes 520 are direct descendants of corresponding level 3 nodes 515. The level 4 nodes 520 each represent an on-disk range of 1 Megabyte (MB). The maximum number of level 4 nodes 520 that can be a child of a single level 3 node 515 is 2048.

The level 5 nodes 525 are direct descendants of corresponding level 4 nodes 520. The level 5 nodes 525 each represent an on-disk range of 32 KB. The maximum number of level 5 nodes 525 that can be a child of a single level 4 node 520 is 32. The level 5 nodes 525 are leaf nodes and represent a single data block, which in this example is 32 KB. Each level 5 node is capable of containing mapping information for a corresponding IMCU loaded into volatile memory. The mapping information specifically contains information that maps the on-disk starting address to the in-memory address of the loaded IMCU.

Populating the Directory Map

In an embodiment, the nodes of a tree structure are created on-demand to store mapping between (a) an on-disk page range for the sub-chunk to (b) the in-memory address of a loaded IMCU containing the sub-chunk data. By only creating nodes when needed, the tree structure size is manageable because nodes that do not represent an on-disk page range of any loaded sub-chunk are not created. Additionally, mapping information for the sub-chunk starting address to IMCU in-memory address are only stored in selective leaf nodes. However, all nodes that are fall under the traversal path of the selective leaf nodes need to be instantiated as well. As discussed previously, each node within the tree structure represents an on-disk page range. For example, if a sub-chunk has an on-disk starting address of 0 kb and the directory map tree structure is currently null, then the population of the tree structure requires that all nodes on the traversal path to the leaf node that represent a range covering the on-disk starting address of 0 kb are created.

Figure 6:
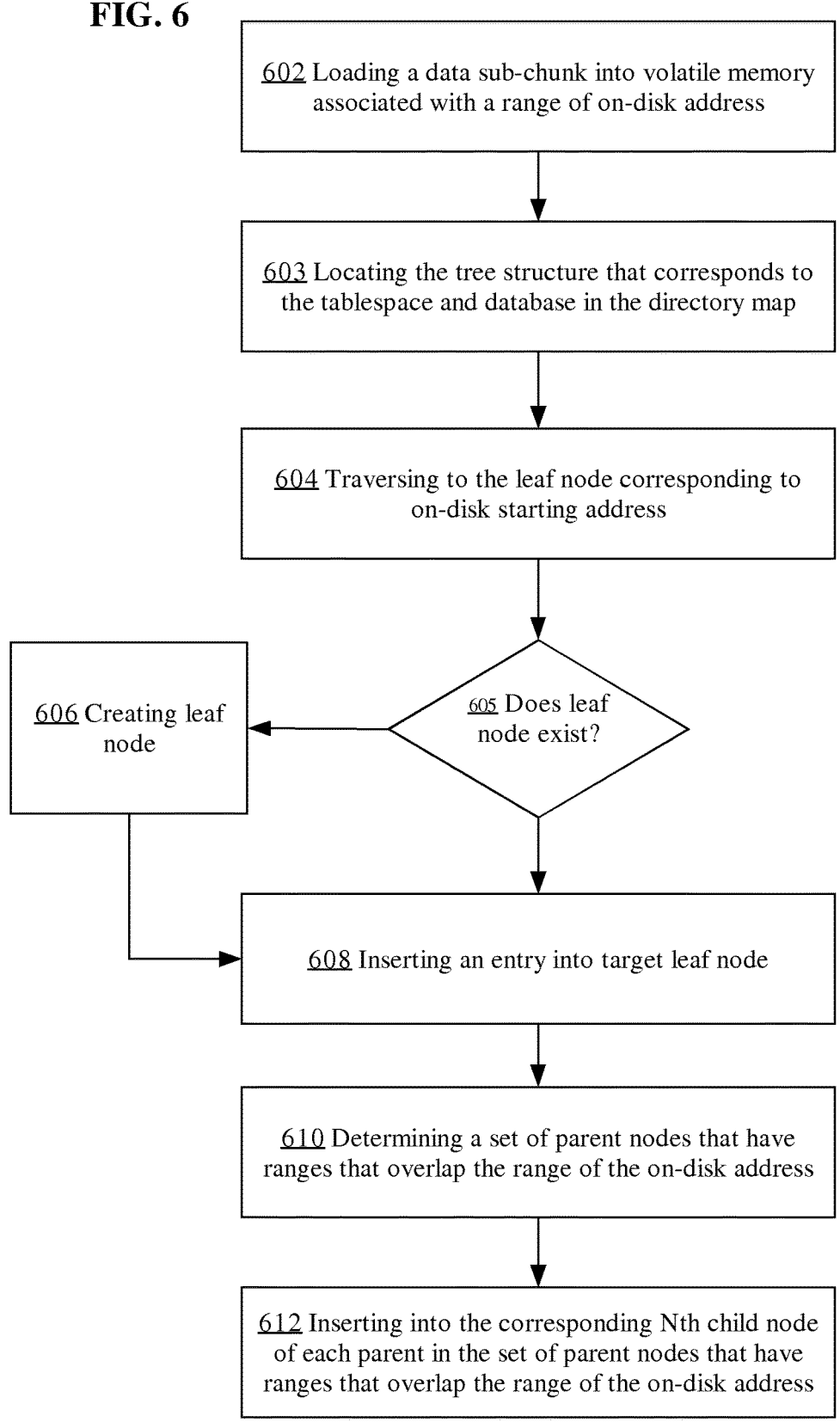
FIG. 6 depicts an embodiment for populating a node hierarchy tree structure.

FIG. 6 depicts an embodiment of the method of populating a tree structure in a directory map with associated in-memory addresses for the on-disk page ranges.

Step 602 depicts the step of loading a particular sub-chunk, corresponding to an on-disk address range, into the volatile memory of a server node. Once the sub-chunk is loaded into volatile memory, a pointer to the in-memory address of the loaded sub-chunk is created.

Locating the Appropriate Tree Structure

Step 603 depicts locating the appropriate tree structure within the directory map. In an embodiment, the directory map maintains multiple tree structures for different tablespaces. The appropriate tree structure may be located using the database ID and the tablespace ID. For example using FIG. 5A, if the loaded sub-chunk refers to an on-disk starting address in database "01" and tablespace "01", then the database server would use the database and tablespace ID to locate the appropriate tree structure as tree structure 501.

Locating the Leaf Node that Covers Start Address of Sub-Chunk

Once the appropriate tree structure is located, at step 604 the database server traverses from the root node 505 down to the leaf node that corresponds to the target on-disk starting address. Traversing nodes involves examining a particular node, which represents an on-disk address range, and then locating the appropriate child node that has a sub-range that also contains the target on-disk address. If no such child node exists, it is created.

Ultimately, the traversal arrives at one of the level 5 nodes 525 (leaf nodes). If no leaf node exists for the corresponding target on-disk starting address, then the server node creates the leaf node. Step 605 depicts the server node determining whether the particular leaf node needs to be created. If the leaf node does not exist, then the server node creates the leaf node (step 606). If the leaf node already exists, then the server node proceeds to step 608, inserting an entry into the leaf node, discussed herein.

An example of the operation performed in steps 604, 605, and 606 is given hereafter with reference to FIG. 5B. For the purpose of explanation, assume that the on-disk start address of the newly-loaded sub-chunk corresponds to 0 KB. The server node begins the traversal at the root node 505 (step 604). If the tree structure were previously null, then root node 505 would first be instantiated. Then subsequent child nodes along the path to the target leaf node would also be instantiated. For instance, after creating the root node 505, the server node would then create the appropriate child node on level 2, which would be a level 2 node 510. The level 2 node 510 created has an on-disk address range that covers the target on-disk address, in this case 0 KB to 1 TB. After the level 2 node 510 is created, the server node creates the appropriate level 3 node 515 that has an on-disk address range that covers the target on-disk address and traverses down to the newly created node. The level 3 node 515 created has an on-disk page covering 0 KB to 2 GB. Then the server node creates the appropriate level 4 node 520 that has an on-disk address range covering the target on-disk address and traverses down to the newly created node. In this case the level 4 node 520 has an on-disk address range of 0 KB-1024 KB (1 MB). Since no previous leaf nodes from the level 4 node 520 existed, the server node determines that the leaf node does not exist (step 605). Then the server node creates the appropriate level 5 node 525 (leaf node), that has an on-disk address range covering the target on-disk address and traverses down to the newly created node (step 606). In this case, the level 5 node 525 created has an on-disk address range from 0 KB to 32 KB.

Inserting Mapping Information into the Home Leaf Node

Step 608 depicts inserting mapping information into the level 5 node 525, which is the leaf node associated with the on-disk address range that includes the starting on-disk address of the sub-chunk that was loaded into memory. The leaf node associated with the on-disk address range that includes the starting on-disk address of the sub-chunk that was loaded into memory is referred to herein as the "home leaf node". In one embodiment, the entry inserted into the home leaf node includes (a) the on-disk address range of the newly-loaded sub-chunk, and (b) a pointer to the start of in-memory area into which the data items from the sub-chunk were loaded. In embodiments, the entry that is inserted into the home leaf node may alternatively include the on-disk start address of the sub-chunk, the on-disk size of the sub-chunk, a "home server node identifier" that identifies the server node that hosts the IMCU containing the sub-chunk, and a pointer to the in-memory address of the IMCU containing the sub-chunk. Yet other embodiments also include host socket information.

Determining Parent Nodes that Cover any Portion of the Loaded-Subchunk's on-Disk Address Range In step 610, the server node determines the parent nodes (level 4 nodes 520) of the leaf nodes that have an on-disk address range that overlaps the on-disk address range of the newly-loaded sub-chunk. The purpose of determining the set of parent nodes that have on-disk address ranges that overlap the on-disk address range of the newly-loaded sub-chunk is to determine how many corresponding leaf nodes the sub-chunk entry will be inserted into. For example, if the target on-disk address range for the newly-loaded sub-chunk is 10 MB in length (0 KB-10,240 KB), then at step 610 the server node would identify the set of parent nodes that cover the range of 0 KB to 10,240 KB. At this point, if such nodes do not already exist, then they are created.

In the present example, the process of creating a set of parent nodes of leaf nodes that cover the entire on-disk address range of the newly-loaded sub-chunk would require the server node to traverse back up the tree structure until it reaches a node that has a range that covers the entire on disk page range (0 KB-10,240 KB). In the above example, the server node would traverse back up to the level 3 node 515 that represents a range from 0 kb-2 GB because this range fully encompasses the on-disk address range of the newly-loaded sub-chunk. Then the server node examines all child nodes of the level 3 node 515, which are level 4 nodes 520, to see which ones have ranges that are covered by the target on-disk address range. If any child nodes that cover the target on-disk range have not previously been instantiated, then the server node would create those level 4 nodes 520. The set of level 4 nodes 520 (parent nodes of leaf nodes) are as follows:

Level 4 Nodes:
Node 1 (0-1024 KB)
Node 2 (1025-2048 KB)
Node 3 (2049-3072 KB)
Node 4 (3073-4096 KB)
Node 5 (4097-5120 KB)
Node 6 (5121-6144 KB)
Node 7 (6145-7168 KB)
Node 8 (7169-8192 KB)
Node 9 (8193-9216 KB)
Node 10 (9217-10240 KB)

Inserting Mapping Information into Additional Leaf Nodes

As mentioned above, at step 608, mapping information is inserted into the leaf node that covers the starting on-disk address of the newly-loaded sub-chunk. In step 612, the same mapping information is inserted into additional leaf nodes. The benefit of inserting mapping information into selected leaf nodes that fall within the on-disk address range of the newly loaded sub-chunk shall be described in greater detail hereafter.

Figure 7:
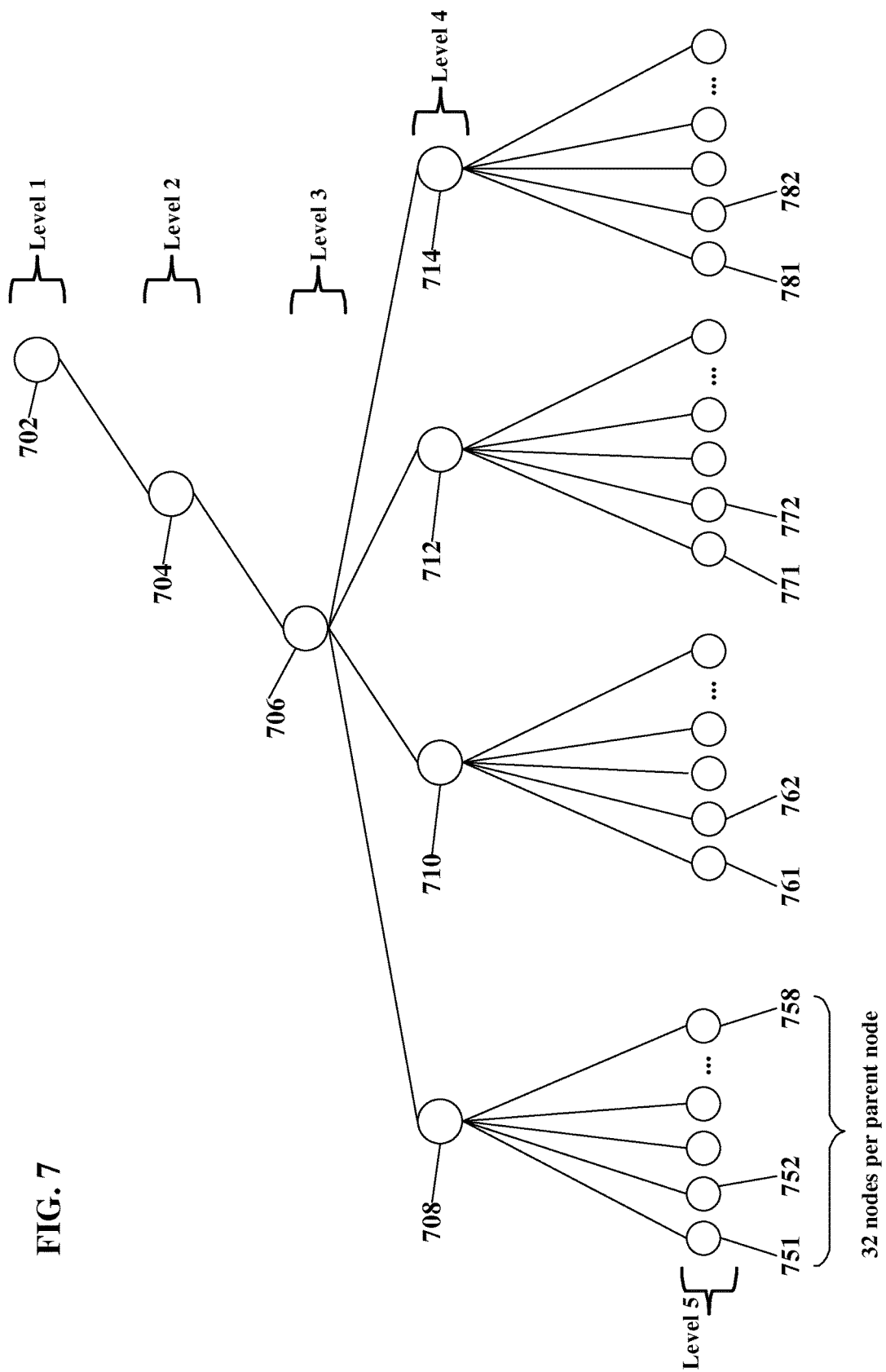
FIG. 7 depicts an embodiment a node hierarchy tree structure focusing on the leaf node level.

Step 608 shall be described in reference to FIG. 7, which depicts a more detailed tree structure than that illustrated in FIG. 5B. Referring to FIG. 7, the tree structure illustrated therein includes multiple level 4 nodes and level 5 nodes (leaf nodes). For the purpose of describing step 608, it shall be assumed that the newly-loaded sub-chunk corresponds to an on-disk address range with a starting address of 33 KB, length of 2 MB, and within the database 0 and table space 1.

As described in step 606, the server node locates the appropriate tree structure in the directory map based upon the database identifier 0 and table space identifier 1. In the present example, it shall be assumed that the tree structure with root node 702 is identified at step 606. During step 607, the server node traverses from root node 702 to node 704 on level 2. From node 704, the server node system further traverses to node 706, on level 3, and then down to node 708 on level 4. For the purposes of this example, node 702, 704, 706, and 708 have been previously instantiated. From node 708, the server node would further traverse to a level 5 node corresponding to the on-disk address range that covers the sub-chunk starting address of 33 kb.

In the tree illustrated in FIG. 7, each level 5 node represents a 32 kb range. Therefore, node 751 would represent range 0-32 kb and node 752 would represent range 33-64 kb. Therefore, the server node would instantiate node 752. At step 608, a pointer to the in-memory address of the newly-loaded sub-chunk data is inserted into node 752.

At step 610, the server node system uses the on-disk address range of the newly-loaded sub-chunk to determine a set of parent nodes on level 4 that fall under the target on-disk address range. The on-disk address range of the newly-loaded sub-chunk may be determined by adding the on-disk size of the sub-chunk to the on-disk starting address of the sub-chunk. In this case the starting address is 33 kb and the on-disk size of the sub-chunk is 2 MB. Therefore, the end address for this particular on-disk address range equals 2081 kb. In another embodiment, the information related to the on-disk address range may include the end address, in which case the end address would not need to be calculated from the starting address and length.

In FIG. 7 the current parent node on level 4, which contains the on-disk address range starting address, is node 708. Node 708 represents 0-1 MB (0-1024 kb) range. The adjacent parent node on level 4 is node 710, which represents the 1-2 MB (1025-2048 kb) range. Since the on-disk address range of the sub-chunk spans from 33 kb to 2081 kb, node 710 falls within the sub-chunk's on-disk address range and is added to the set of parent nodes that overlap the on-disk address range. The next parent node on level 4 is node 712, which represents the 2-3 MB (2049-3073 kb) range. Since the node 712 overlaps with the sub-chunk's on-disk address range (33-2081 kb), it is added to the set of parent nodes that overlap the sub-chunk's on-disk address range. The next parent node on level 3 is node 714, which represents the 3-4 MB (3074-4096 kb) range. Since the sub-chunk's on-disk address range (33-2081 kb) does not overlap with node 714, node 714 is not added to the set of parent nodes that overlap.

At step 612, the server determines the ordinal position (N) of the home leaf node. The ordinal position of the home leaf node is the position of the home leaf node relative to the set of potential leaf nodes descending from the home leaf node's parent node. For example, if the home leaf node's parent node has 100 potential children, and the home leaf node is the $12^{th}$ of those 100 potential children, then N is 12.

Once N is determined for the home leaf node, the Nth child node is determined for each parent node in the set of parent nodes created in step 610, Referring to FIG. 7, the home child node is node 752. Node 752 is the second node out of the set of 32 possible child nodes of the parent node (node 708). Thus, in this example, N is 2. Therefore, the mapping information is inserted into the second node of every parent node in the set of parent nodes created in step 610. For example, node 762 is the second child node for parent node 710 and the mapping information would be inserted into node 762. Mapping information would also be inserted into node 772 because it is the second child node of parent node 712.

Loading a Subsequent Sub-Chunk

If the server node needs to populate mapping information for a second loaded-subchunk, then the server node would traverse any existing nodes along the specified path until the server node needs to instantiate new node. For example, if the start address of the second loaded sub-chunk is on-disk address 1056 KB (the "second start address"), then the server node would first start the traversal from the root node 505. Since the root node 505 has at least one child node (level 2 node 510) that has an on-disk address range of 0 KB to 1 TB, there is no need to instantiate a new child node because the on-disk address range of the existing level 2 node 510 covers the second start address. Then, the server traverses down to the existing level 2 node 510 and examines the existing child nodes of level 2 node 510 to see if one of the ranges of the child node contains the second start address. Here, the previously created level 3 node 515 covers a range of 0-2 GB, which covers the second start address. This cycle continues until the server node either finds the no child nodes covering the range for the second start address or the appropriate leaf node is found. In this case, the server node would not find an existing level 4 node 520 because only one level 4 node 520 exists and that node only covers the on-disk address range of 0 KB-1024 KB. Therefore the server node would instantiate a new level 4 node 520 that covers the 1 MB range of 1025 KB-2048 KB. After creating a new level 4 node 520 to cover the on-disk address range that includes the second target on-disk address, the server node would create the level 5 node 525 (leaf node), and add to the node an entry that maps the on-disk address range of the second sub-chunk to the in-memory address for the IMCU that includes the data items from the second sub-chunk.

Searching the Directory Map

Once the directory map has been constructed as described above, the database server uses the directory map when determining the execution plans for database commands. For example, assume that a database server receives a request that requires access to a particular set of data. Assume that the particular set of data is stored on disk beginning at a particular on-disk address. The database server uses that particular on-disk address (the "target on-disk address") to traverse the directory map to determine whether the set of data that is required by the database command resides in any IMCU and, if so, the in-memory location of that IMCU.

Figure 8:
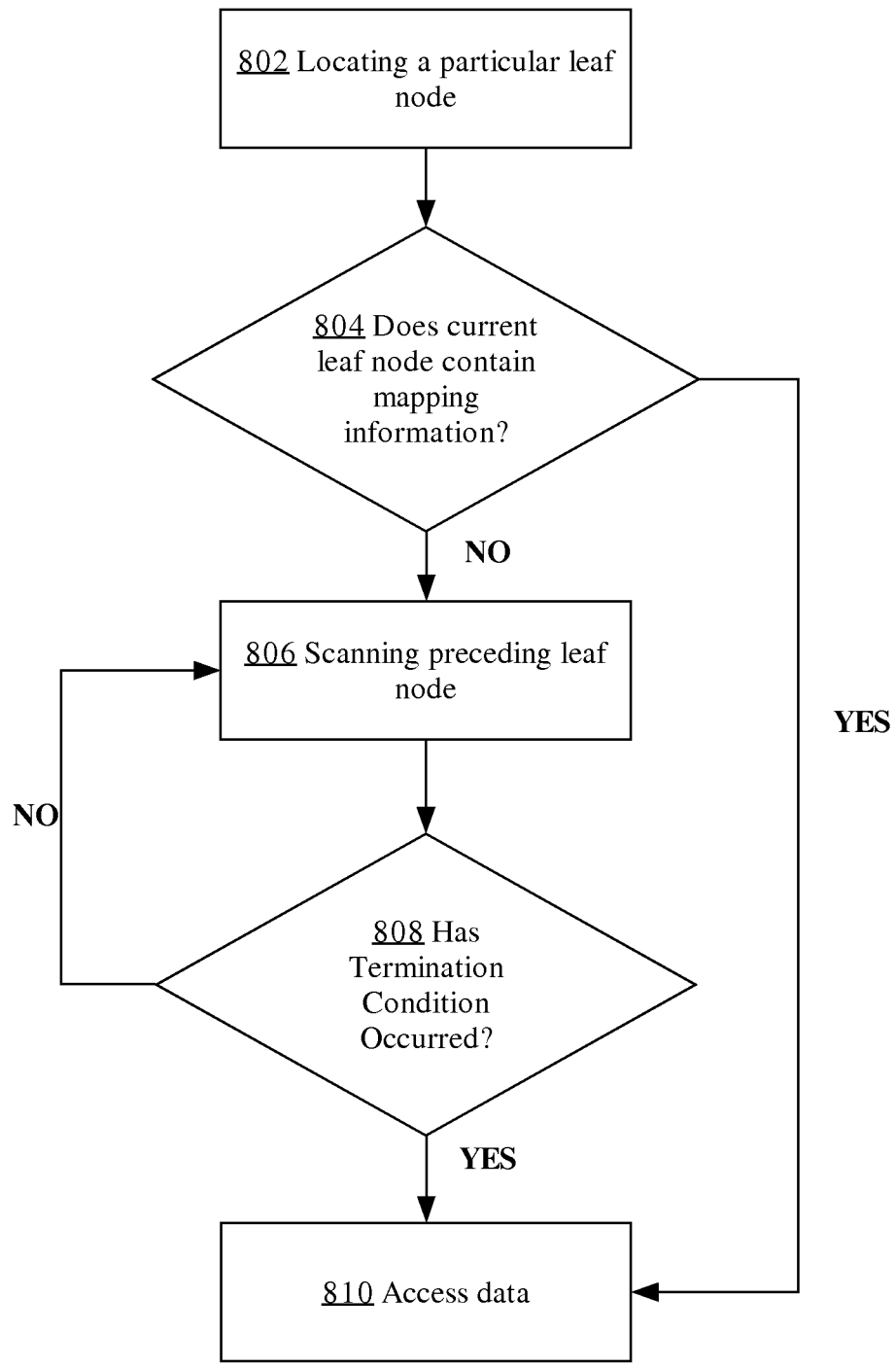
FIG. 8 depicts an embodiment for searching a node hierarchy tree structure for mapping information.

FIG. 8 is a flowchart that illustrates a method for searching a tree structure in a directory map based on a target on-disk address, according to one embodiment. Step 802 depicts locating the appropriate tree structure within the directory map. Step 802 first involves using a database identifier and table space identifier as a key to determine which tree structure within the directory map to traverse.

Step 803 involves traversing from the root node of that tree structure to the "home leaf node" that represents the on-disk range that includes the target on-disk address. For example, if the target on-disk address is 1047 KB, then the appropriate child node, according to FIG. 7, is node 761 because each level 5 node represents 32 KB each; therefore node 751 represents range 0-31 KB, node 752 represents 32-63 kb, and continuing to node 761 that represents 1024-1055 KB.

At step 804, the database server determines whether the home leaf node contains mapping information. For example, if node 761 contains mapping information, then control proceeds from step 804 to step 810. Otherwise control passes to step 806.

At step 806, the database server selects and scans the leaf node that immediately precedes the currently-selected leaf node. For example, leaf node 758 is the 32$^{nd}$ child of node 708. Therefore, leaf node 758 immediately precedes node 761 in the tree structure. Scanning the preceding child node involves traversing up to the node of 706 and then back down to node 708 and 758.

Step 808 depicts determining whether a termination condition has occurred. A termination condition is a situation where the step of scanning preceding child nodes is terminated. In an embodiment, termination conditions occur when either: a leaf node contains mapping information that includes the target on-disk starting address; a leaf node contains mapping information that does not include the target on-disk starting address; and a threshold number of leaf nodes has been scanned.

According to one embodiment, one termination condition is that the leaf node scan arrives at a leaf node that contains mapping information. In one scenario, the mapping information maps to an on-disk address range that includes the target on-disk address, which then triggers step 810, accessing the target data from the particular IMCU.

For example, assume that the target on-disk address is 1047 KB. The home leaf node for the target address of 1047 KB is node 761. Assume further that only node 752 contains mapping information, and that the mapping information in node 752 is for a sub-chunk with the on-disk address range from 33 KB to 2048 KB. Under these circumstances, at step 804, node 761 is scanned for mapping information. Since node 761 does not contain mapping information, control proceeds to step 806 and node 758 (preceding node) is scanned for mapping information. Control loops between step 806 and 808 during which each preceding node, including node 752 is scanned. Since node 752 contains mapping information, the termination condition is triggered (step 808) and the mapping information is evaluated. Since the mapping information of node 752 (33 KB to 2048 KB) contains the target on-disk address, the target data is accessed by going to the IMCU referenced by the in-memory address that is specified in the mapping information of node 752.

In another scenario, the termination condition is triggered when mapping information maps to an on-disk address range that does not include the target on-disk address. By finding mapping information that does not cover the target on-disk address; the server node determines that the target on-disk address is not loaded into volatile memory because any preceding leaf nodes that would have mapping information have already been scanned. Therefore at step 810, the server node would access the target data by going to disk.

For example, if the mapping information in node 752 stated that the on-disk starting address is 33 KB but the length of the on-disk address range is only 64 KB, then the server node would conclude that the loaded IMCU only covers an on-disk address range from 33 KB to 97 KB. Therefore the target on-disk address of 1047 KB (represented by node 761) has not been loaded into an IMCU and the server node would proceed to step 810 and retrieve the target data from a source other than an IMCU (e.g. from disk, from a buffer cache, etc.).

In yet another scenario, the termination condition is triggered when mapping information maps an on-disk address range that includes the target on-disk address however, the mapping information maps to a different server node. In this scenario, since the target data has been already loaded into volatile memory of another server node, the server node will access the target data from disk because only the load operation master is tasked with distributing load operation requests to other server nodes for a particular segment. This scenario may occur if the target data was loaded into an IMCU on another server but, the load operation master did not receive a broadcast message informing the load operation master of the new IMCU before distributing data chunks to other server nodes. The benefit of requiring the server node to access data directly from disk, rather than creating a new request for another server node, is that it confines distribution of data requests to the load operation master and reduces the chance of data requests being passed from one data server to another.

For example, if the mapping information in node 752 stated that the on-disk starting address is 33 KB and the length of the on-disk address range is only 64 KB, but the in-memory address value was "NODE102", then the server node would conclude that the loaded IMCU in on a foreign server node. Therefore the server node would proceed to step 810 and retrieve the target data from a source other than an IMCU.

In an embodiment, the termination condition may also include a threshold number of leaf nodes to scan. The purpose of having a threshold number of leaves to scan is to limit the scanning in step 806 and prevent excessive time spent determining whether target data is loaded in an IMCU. The threshold number of leaf nodes is based upon a search boundary defined by the search algorithm. For example, the threshold termination condition may define that only 32 leaf nodes are to be scanned. If no mapping information were found in the scanned 32 leaf nodes, then the server node would conclude that the target on-disk address has not been loaded into volatile memory and would go to disk to retrieve the data. An embodiment, the threshold number of leaf nodes to search is a constant value that is based upon the number of leaf nodes per parent node defined by the tree structure. Since only one "Nth leaf node" of the set of leaf nodes per parent node is populated with mapping information, during scanning it is only necessary to search an entire set of leaf nodes, such as 32 leaf nodes total.

For example, if node 752 did not contain any mapping information and the target on-disk address is 1047 KB (node 761), then after scanning node 752 the threshold number of nodes would have been met (32 nodes scanned). Therefore the server node would conclude that the target data has not been loaded into an IMCU and proceed to step 810 to access the target data from a source other than an IMCU.

Step 810 depicts retrieving the target data. Retrieving target data may include, but is not limited to, retrieving target data from disk or accessing an IMCU loaded into volatile memory of the server node based upon the mapped in-memory address.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
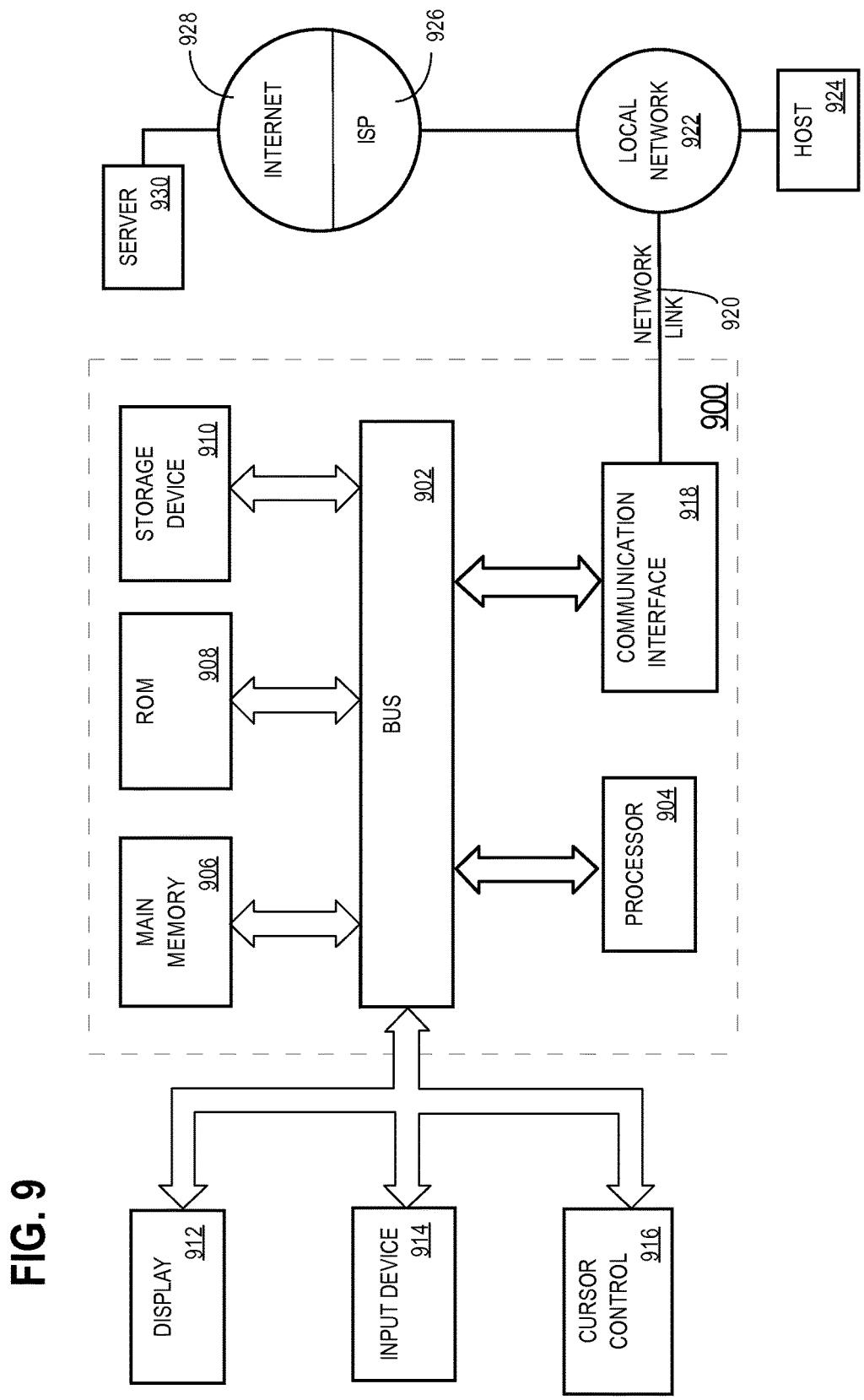
FIG. 9 is a block diagram illustrating a computer system that may be used to implement the techniques described herein.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, in volatile memory of a particular node, a directory map that maps on-disk address ranges to volatile memory locations;
   wherein the directory map contains, within the volatile memory, a node hierarchy in which each node represents an on-disk address range;
   wherein, for each child node in the node hierarchy, the on-disk address range of the child node is a sub-range of the on-disk address range of a parent node of the child node;
   loading a data chunk, into the volatile memory of the particular node, starting at a particular in-memory address;
   wherein the data chunk has a particular on-disk starting address and covers a particular range of on-disk addresses;
   in response to loading the data chunk, performing the steps of:
     locating a target leaf node, in the node hierarchy, that has a range into which the particular on-disk starting address falls;
     wherein, within the node hierarchy, the target leaf node has a particular parent node;
     determining that the target leaf node is an Nth child of the particular parent node;
     inserting an entry into the target leaf node, wherein the entry includes:
       an indication of the particular on-disk starting address, and
       the particular in-memory address;
     determining a particular set of parent nodes, other than the particular parent node, that:
       are parents of leaf nodes, and
       have ranges that overlap with the particular range of on-disk addresses; and
     inserting, into an Nth leaf node of each parent node in the particular set of parent nodes, an entry that includes:
       an indication of the particular on-disk starting address, and
       the particular in-memory address.

2. The method of claim 1 wherein:
   the particular node is a node in a multiple-node system; and
   the directory map also maps on-disk address ranges to host nodes.

3. The method of claim 1 further comprising:
   receiving a request that requires desired data that is associated with a target on-disk address;
   using the directory map to determine whether desired data is available from an in-memory chunk by performing the steps of:
     traversing the directory map to a leaf node that represents the target on-disk address;
     if the leaf node is null, then scanning preceding leaf nodes for an entry that contains a range that includes the target on-disk address, until any termination condition from a set of one or more termination conditions is satisfied;
   wherein scanning the preceding leaf nodes includes scanning leaf nodes of a preceding parent node; and
   wherein the set of one or more termination conditions includes finding an entry that covers a range that includes the target on-disk address.

4. The method of claim 3 further comprising:
   in response to locating, within a preceding leaf node, an entry that (a) covers the range that includes the target on-disk address and (b) specifies a certain in-memory address, accessing the desired data from an in-memory chunk that resides in volatile memory at the certain in-memory address.

5. The method of claim 3, wherein:
the set of one or more termination conditions includes scanning a particular threshold number of preceding leaf nodes without finding an entry that contains a range that includes the target on-disk address.

6. The method of claim 5 further comprising:
in response to scanning the particular threshold number of preceding leaf nodes without finding an entry that contains a range that includes the target on-disk address, accessing the desired data from a source other than an IMCU.

7. The method of claim 3, wherein:
the set of one or more termination conditions includes finding an entry that covers a range that does not include the target on-disk address; and
the method further comprises, in response to finding an entry that covers a range that does not include the target on-disk address, accessing the desired data from a source other than an IMCU.

8. The method of claim 3, wherein:
the particular node is a node in a multiple-node system;
the set of one or more termination conditions includes finding an entry that covers a range that includes the target on-disk address, but maps to another server node; and
the method further comprises, in response to finding an entry that covers a range that includes the target on-disk address, but maps to another server node, accessing the desired data from a source other than an IMCU.

9. The method of claim 1, wherein the on-disk address range, represented by nodes in the node hierarchy, covers an entire table space within a database.

10. The method of claim 1, wherein the entry inserted into the target leaf node includes data from which the particular range of on-disk addresses may be determined.

11. One or more non-transitory media storing instructions, wherein the instructions include
instructions which, when executed by one or more processors, cause:
maintaining, in volatile memory of a particular node, a directory map that maps on-disk address ranges to volatile memory locations;
wherein the directory map contains, within the volatile memory, a node hierarchy in which each node represents an on-disk address range;
wherein, for each child node in the node hierarchy, the on-disk address range of the child node is a sub-range of the on-disk address range of a parent node of the child node;
loading a data chunk, into the volatile memory of the particular node, starting at a particular in-memory address;
wherein the data chunk has a particular on-disk starting address and covers a particular range of on-disk addresses;
in response to loading the data chunk:
locating a target leaf node, in the node hierarchy, that has a range into which the particular on-disk starting address falls;
wherein, within the node hierarchy, the target leaf node has a particular parent node;
determining that the target leaf node is an Nth child of the particular parent node;
inserting an entry into the target leaf node, wherein the entry includes:
an indication of the particular on-disk starting address, and
the particular in-memory address;
determining a particular set of parent nodes, other than the particular parent node, that:
are parents of leaf nodes, and
have ranges that overlap with the particular range of on-disk addresses; and
inserting, into an Nth leaf node of each parent node in the particular set of parent nodes, an entry that includes:
an indication of the particular on-disk starting address, and
the particular in-memory address.

12. The one or more non-transitory media of claim 11 wherein:
the particular node is a node in a multiple-node system; and
the directory map also maps on-disk address ranges to host nodes.

13. The one or more non-transitory media of claim 11, wherein the instructions further include
instructions which, when executed by one or more processors, cause:
receiving a request that requires desired data that is associated with a target on-disk address;
using the directory map to determine whether desired data is available from an in-memory chunk by performing the steps of:
traversing the directory map to a leaf node that represents the target on-disk address;
if the leaf node is null, then scanning preceding leaf nodes for an entry that contains a range that includes the target on-disk address, until any termination condition from a set of one or more termination conditions is satisfied;
wherein scanning the preceding leaf nodes includes scanning leaf nodes of a preceding parent node; and
wherein the set of one or more termination conditions includes finding an entry that covers a range that includes the target on-disk address.

14. The one or more non-transitory media of claim 13, wherein the instructions further include
instructions which, when executed by one or more processors, cause:
in response to locating, within a preceding leaf node, an entry that (a) covers the range that includes the target on-disk address and (b) specifies a certain in-memory address, accessing the desired data from an in-memory chunk that resides in volatile memory at the certain in-memory address.

15. The one or more non-transitory media of claim 13, wherein:
the set of one or more termination conditions includes scanning a particular threshold number of preceding leaf nodes without finding an entry that contains a range that includes the target on-disk address.

16. The one or more non-transitory media of claim 15, wherein exection of the instructions further causes:
in response to scanning the particular threshold number of preceding leaf nodes without finding an entry that contains a range that includes the target on-disk address, accessing the desired data from a source other than an IMCU.

17. The one or more non-transitory media of claim 13, wherein:
the set of one or more termination conditions includes finding an entry that covers a range that does not include the target on-disk address; and
execution of the instructions further causes, in response to finding an entry that covers a range that does not include the target on-disk address, accessing the desired data from a source other than an IMCU.

18. The one or more non-transitory media of claim 13, wherein:

the particular node is a node in a multiple-node system;

the set of one or more termination conditions includes finding an entry that covers a range that includes the target on-disk address, but maps to another server node; and execution of the instructions further causes, in response to finding an entry that covers a range that includes the target on-disk address, but maps to another server node, accessing the desired data from a source other than an IMCU.

19. The one or more non-transitory media of claim 11, wherein the on-disk address range, represented by nodes in the node hierarchy, covers an entire table space within a database.

20. The one or more non-transitory media of claim 11, wherein the entry inserted into the target leaf node includes data from which the particular range of on-disk addresses may be determined.

\* \* \* \* \*

UNITED STATES PATENT AND TRADEMARK OFFICE
CERTIFICATE OF CORRECTION

Page 1 of 1

PATENT NO. : 9,645,928 B2
APPLICATION NO. : 14/820672
DATED : May 9, 2017
INVENTOR(S) : Mukherjee et al.

It is certified that error appears in the above-identified patent and that said Letters Patent is hereby corrected as shown below:

In the Specification

In Column 5, Line 5, delete "hierarchies." and insert -- hierarchies; --, therefor.

In Column 16, Line 67, delete "in on" and insert -- in --, therefor.

In the Claims

In Column 22, Line 53, in Claim 16, delete "exection" and insert -- execution --, therefor.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*